United States Patent
Baerg et al.

[15] 3,670,892
[45] June 20, 1972

[54] REVERSE OSMOSIS APPARATUS

[72] Inventors: William Baerg, 1992 Lemnos Drive, Costa Mesa, Calif. 92626; Pierre St. Guilhem Humber, 338 Reims Lane, Costa Mesa, Calif. 92627

[22] Filed: Nov. 6, 1969

[21] Appl. No.: 874,641

[52] U.S. Cl. ............................ 210/134, 210/136, 210/321, 210/502
[51] Int. Cl. ................................ B01d 39/18, B01d 31/00
[58] Field of Search ................. 210/130, 136, 134, 321, 490, 210/22, 23, 342, 502

[56] References Cited

UNITED STATES PATENTS

| | | | |
|---|---|---|---|
| 3,327,859 | 6/1967 | Pall | 210/266 |
| 3,367,505 | 2/1968 | Bray | 210/321 |
| 3,396,103 | 8/1968 | Huntington | 210/342 X |
| 3,449,245 | 6/1969 | Johnson et al. | 210/502 X |
| 3,456,803 | 7/1969 | Rak | 210/321 X |
| 3,504,796 | 4/1970 | Bray | 210/321 X |
| 3,505,216 | 4/1970 | Kryzer | 210/321 X |
| 1,825,631 | 9/1931 | Horrath | 210/23 |
| 3,365,061 | 1/1968 | Bray | 210/130 |
| 3,457,170 | 7/1969 | Havens | 210/23 |
| 3,370,708 | 2/1968 | Hultgren et al. | 210/342 X |

*Primary Examiner*—Frank A. Spear, Jr.
*Attorney*—Thomas H. Jones and Smyth, Roston & Pavitt

[57] ABSTRACT

A reverse osmosis unit in which the membrane has a supported side and an unsupported side, with a liquid product reservoir in communication with the supported side, and a feed liquid chamber in contact with the unsupported side. The unit includes means to maintain the pressure of the feed liquid at a sufficiently high level to prevent the flow of liquid through the membrane from the supported side to the unsupported side when the inlet to the feel liquid chamber is closed. A reverse osmosis unit in which the membrane is supported by a porous layer material containing activated charcoal.

13 Claims, 5 Drawing Figures

PATENTED JUN 20 1972

INVENTORS.
WILLIAM BAERG
PIERRE ST. GUILHEM HUMBER
BY KENDRICK and SUBKOW

Thomas H. Jones
ATTORNEYS

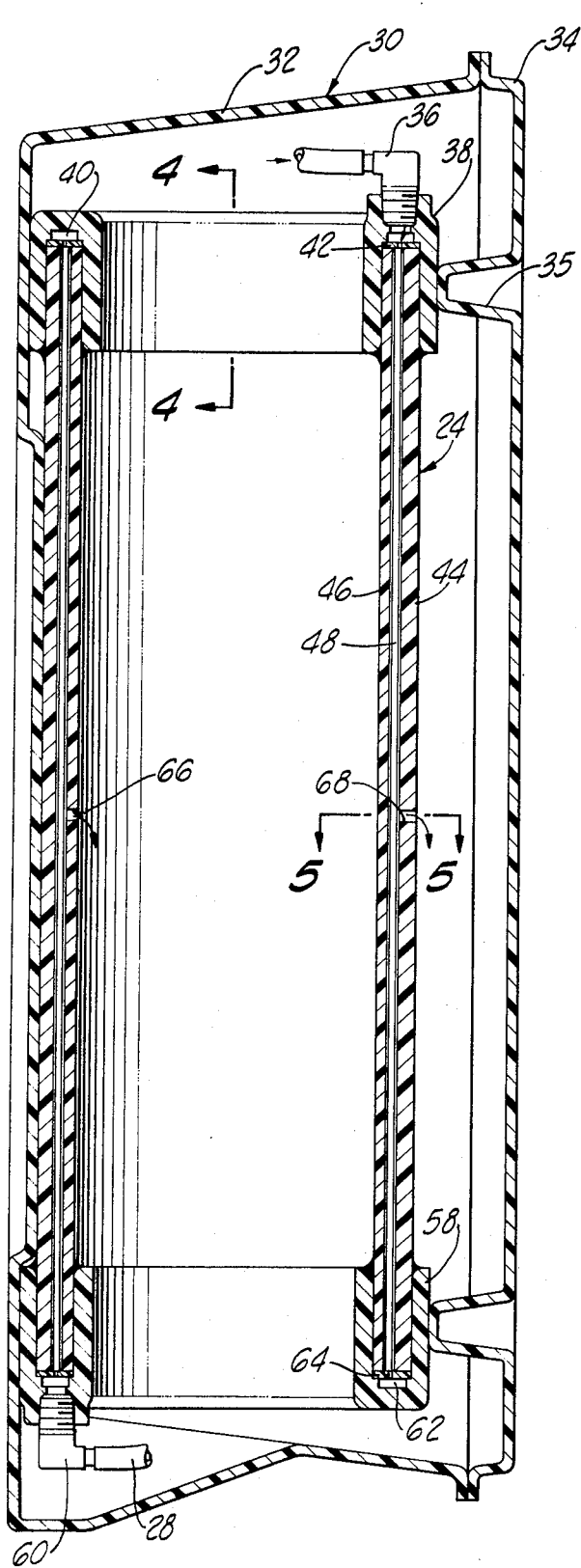
FIG. 3.
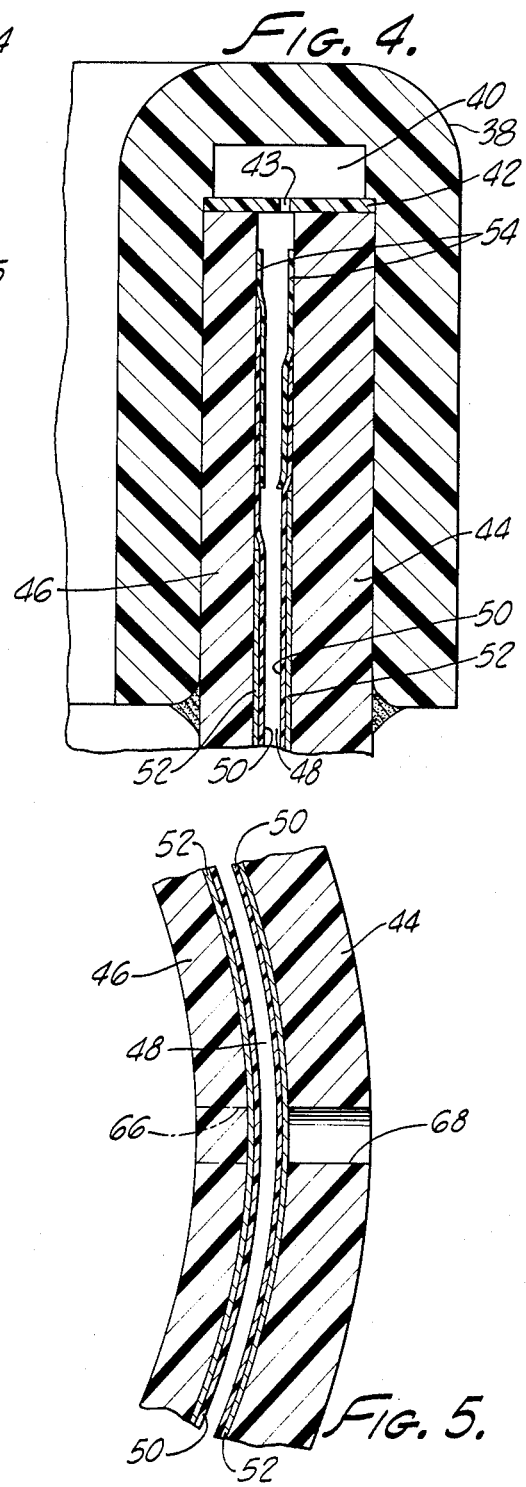
FIG. 4.
FIG. 5.
INVENTORS.
WILLIAM BAERG
PIERRE ST. GUILHEM HUMBER
BY KENDRICK and SUBKOW
ATTORNEYS

REVERSE OSMOSIS APPARATUS

At the present time, reverse osmosis units are available which may be used as home water purifiers. In general, these devices are quite expensive and are installed as permanent units which require special plumbing. There is a great need for a home desalination unit which can be utilized on an intermittent basis simply by connecting it to a water faucet. Such a unit could be operated, for example, at night to provide sufficient water to supply the family's cooking and drinking needs for the next day. During the time when the unit is not in use, it could also serve as a reservoir for the purified water.

In supplying the need for such a unit, we have developed a home water purifier which is uniquely suitable for intermittent operation. During osmosis, a solvent is transported through a membrane in a direction which tends to equalize the solute concentration on either side of the membrane. When, during osmosis, the solvent flows from the more dilute solution to the less dilute solution, the pressure which results from osmosis is termed the "osmotic pressure". If the more concentrated solution is maintained under a pressure which is equal to the osmotic pressure, no solvent flow will occur. Lastly, if the pressure applied to the more concentrated solution exceeds the osmotic pressure, the solvent flow can be made to reverse such that the solvent flows from the more concentrated solution to the less concentrated solution. This phenomena is called "reverse osmosis".

A variety of semi-permeable osmotic membranes are known to the art and the present invention is not directed to membrane structures which may be used in reverse osmosis. Typical of membranes which have been used for purification of brackish water as well as in other fields, such as food processing, etc., are membranes of cellulose acetate, as illustrated in U.S. Pat. No. 3,344,214 to Manjikian et al. Such membranes are commercially available from the Eastman Kodak Company and may comprise an inhomogeneous film having a thickness of about 0.004 inches with a dense surface layer of about 40 millionths of an inch thick backed by a thicker porous layer.

Inasmuch as reverse osmosis requires the use of pressure, it is necessary to support the membrane. In a reverse osmosis unit, such as a home desalination unit, where operation of the unit is intermittent, we have found that it is necessary to maintain the pressure of the feed liquid on the feed side of the membrane when the flow of feed liquid to the unit is stopped. Without control of the pressure of the feed liquid in contact with the membrane, liquid flow will occur across the membrane from its supported side to its unsupported side due to normal osmotic pressure. In other words, when the unit is shut down, there is a tendency for osmotic flow to occur across the membrane in a direction opposite to the flow of liquid during reverse osmosis. Also, there may be some tendency for flow to occur due to a siphoning action if there is liquid remaining in the inlet and/or outlet lines to the reverse osmosis unit after flow of the feed liquid to the unit is stopped. Flow across the membrane from its supported to unsupported side can result in seriously damaging the membrane and is a problem which we have solved with our invention.

Frequently, the feed liquid which is being purified by a reverse osmosis unit may contain minute quantities of organic materials which can permeate the membrane even better than water itself. Inasmuch as trace amounts of these organic compounds may make the water unpalatable, it is necessary that they be removed. One means by which this may be accomplished is to utilize a reverse osmosis unit in series with a charcoal filtration unit. In such a system, the charcoal would absorb the organic compounds produced by decay of animal or vegetable matter while the reverse osmosis membrane would remove salt.

In our experimentations, we have found that a superior way to utilize activated charcoal in conjunction with a reverse osmosis device is to place a porous material which contains activated charcoal in contact with the product side of the reverse osmosis membrane. This design configuration eliminates many of the problems involved in utilizing a conventional packedbed of charcoal granules in series with a reverse osmosis device.

A key design problem which is encountered in using a packed-bed of charcoal is channeling. In channeling, the liquid flowing through the charcoal bed develops flow paths within the bed termed "channels". Once these channels have developed, liquid flowing through the bed takes the path of least resistance and flows only through the channels. This, of course, is inefficient since it exposes only a small portion of the surface area of the charcoal to the liquid passing through the bed.

A further disadvantage which results from using a conventional packed bed of charcoal granules in conjunction with a reverse osmosis unit relates to the pressure drop across the packed bed of charcoal. In a reverse osmosis unit, the efficiency of the unit is directly related to the pressure drop across the membrane. As this pressure drop increases, both the flux of solvent through the membrane and the salt rejection by the membrane are increased. When a packed-bed charcoal unit is connected in series with a reverse osmosis unit, the charcoal bed reduces the pressure drop across the membrane. Assuming, for example, that the pressure of the liquid feed is fixed, if a packed bed of charcoal is placed on the product water side of a reverse osmosis unit, it will develop a back pressure on the product side of the membrane. This will decrease the pressure drop across the membrane and reduce the efficiency of the membrane. If the packed-bed charcoal unit is placed in series with the osmosis unit on the feed side of the membrane, the pressure of the feed liquid will be reduced by passage through the packed bed before it reaches the membrane. This, too, will cause a reduction in the available pressure for reverse osmosis across the membrane.

As described previously, our use of a porous backing material for the membrane which contains activated charcoal has greatly reduced the problems encountered in the use of a packed-bed of charcoal granules. In addition, this aspect of our invention provides a system which is the ultimate in compactness and eliminates any need for a separate container for the charcoal, as well as means for transporting product water from the reverse osmosis unit to a charcoal bed.

A still further aspect of our invention concerns the use of a plurality of concentrically aligned cylinders in which adjacent pairs of cylinders define an annular feed liquid chamber. A reverse osmosis membrane is placed on the outer surface of the annular chamber which is the inner surface of the larger cylinder. At the same time, a reverse osmosis membrane is placed on the inner surface of the annular chamber, which is formed by the outer surface of the smaller diameter cylinder. The cylinders are held in concentrically aligned position by means of an inlet feed distribution end cap and an outlet or recovery end cap. The inlet end cap defines a manifold chamber which communicates with the annular feed chamber through distributions means that uniformly supplies feed liquid to the annular feed chamber.

The recovery end cap which is positioned at the opposite end of the cylinders from the inlet cap includes means to uniformly collect spent feed liquid after it has passed through the annular feed chamber.

To further illustrate out invention, reference is made to the accompanying drawings which define a preferred embodiment of our invention and in which:

FIG. 3 is a sectional view through the unit illustrating in cross section a reverse osmosis module;

FIG. 4 is an enlarged sectional view taken along the lines 4—4 of FIG. 3 to illustrate the relationship between the inlet end cap and the concentrically aligned cylinders, and FIG. 5 is a sectional view taken along the lines 5—5 of FIG. 3.

Figure 1:
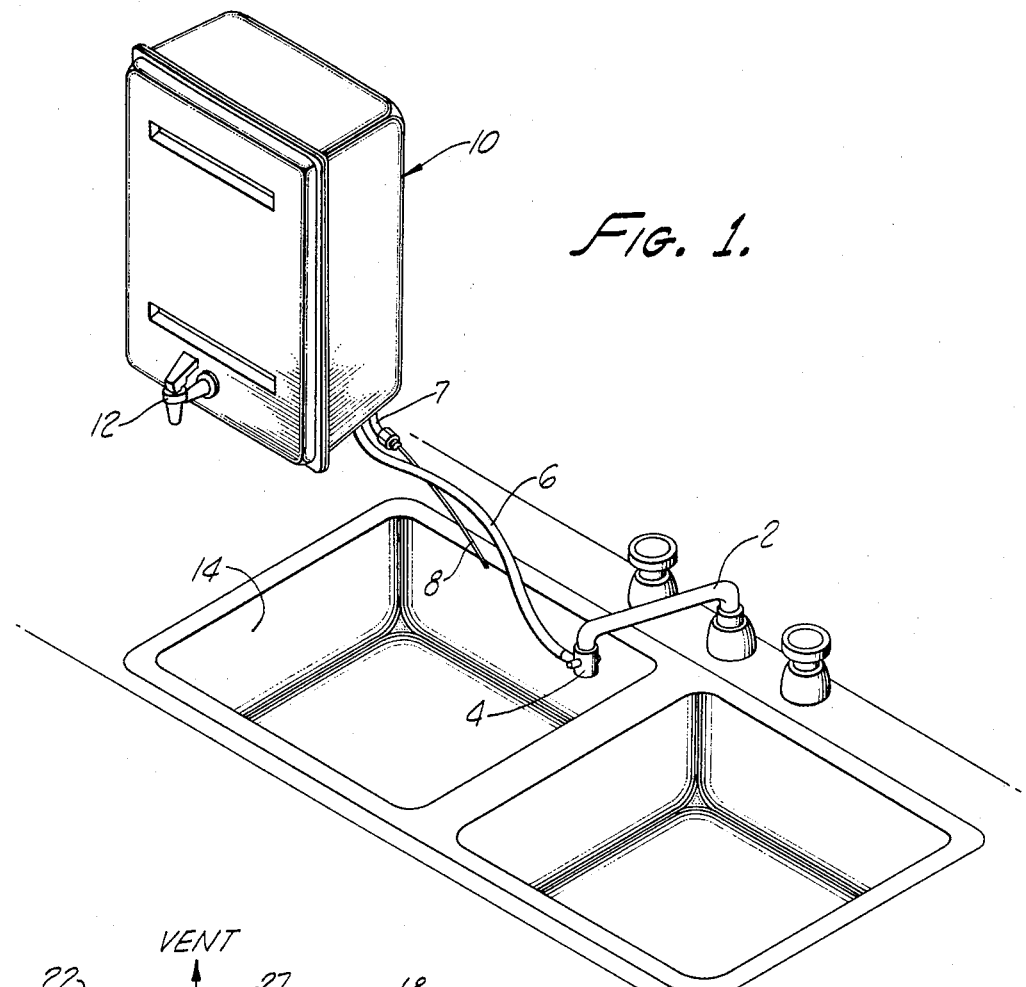
FIG. 1 is a pictorial view showing the reverse osmosis unit hooked up to a common faucet and sink.

Turning to FIG. 1, a home desalination unit 10 is shown connected to a water supply faucet 2 through a diverter valve 4. From the diverter valve 4, the feed water passes through an inlet line 6 through the desalination unit to an outlet line 7. The flow rate of the outlet water is controlled by an outlet restrictor 8, which is conveniently placed over a sink 14 and may be protected by a surrounding tube (not shown). As shown in FIG. 1, the home desalination unit may be placed in an upright position on the counter adjacent the sink or, if desired, it may be hung on the wall adjacent the sink. The product water is removed through outlet valve 12.

Figure 2:
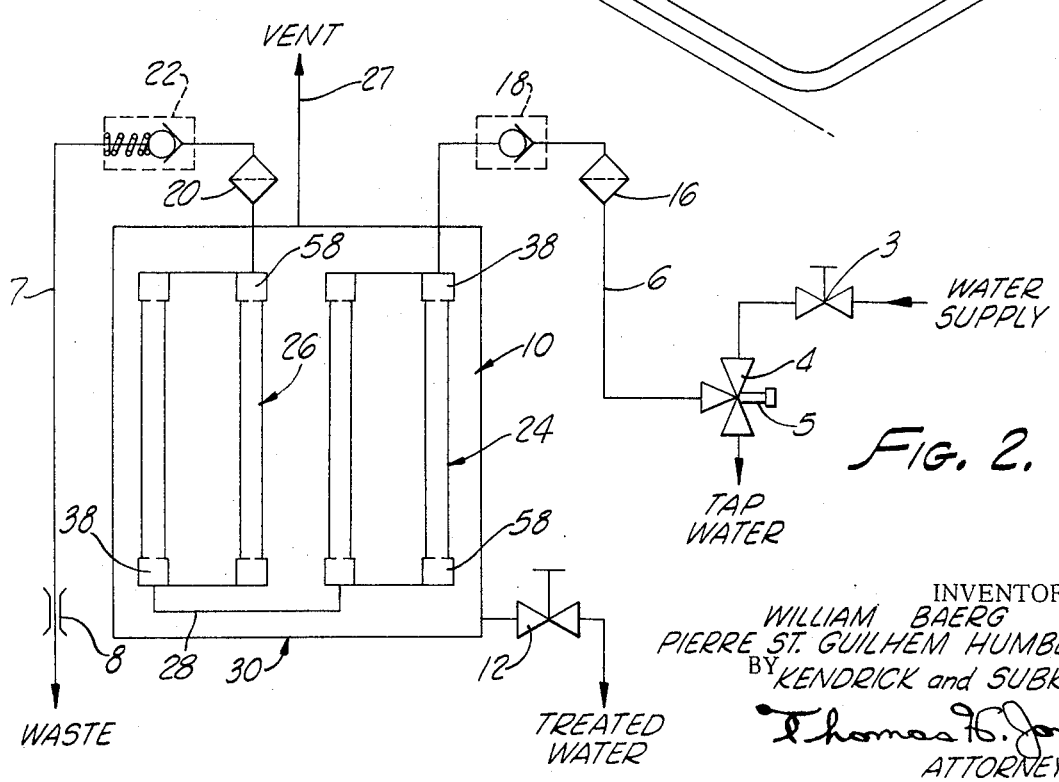
FIG. 2 is a schematic flow diagram illustrating the various component parts of the unit.

Turning to FIG. 2, the water supply may be controlled by a valve 3 which is positioned in series with the diverter valve 4. As illustrated in FIG. 1, the diverter valve may be conveniently placed on the end of a faucet. Diverter valve 4 is nothing more than a three-way valve and on movement of the control arm 5, water can be directed either to the desalination unit 10 or to the sink 14. Water which is diverted to the desalination unit by valve 4 flows through inlet line 6 through a strainer 16. The strainer 16 functions to remove particles from the feed water which might damage the membrane. A suitable strainer which we have employed is one which contains 50-mesh wire cloth having openings of 0.011 inches. The strainer should be easily disconnected from the overall unit so that it can be easily removed for cleaning or replacement.

The entering feed water passes through a check valve 18, which permits flow to the reverse osmosis unit 10 but prevents backflow of water from the unit through inlet line 6 when the unit is not functioning. The entering water then flows to a desalination module 24, which will be described in detail later, and through line 28 to a second desalination module 26. As illustrated, desalination modules 24 and 26 are connected in series in the unit 10. The modules are identical in their configuration; however, it should be understood that module 26 is reversed in its position from module 24. To be more specific, the inlet portion of module 24 is illustrated at the top of module 24 in FIG. 2 while the inlet portion of module 26 is illustrated at its bottom. Similarly, the outlet portion of module 24 is illustrated at its bottom in FIG. 2, while, in the same figure, the outlet portion of module 26 is illustrated at the top of module 26.

If desired, modules 24 and 26 may be connected in a series relationship in which both modules are positioned in the same manner. In this arrangement, the inlets to both modules 24 and 26 would be positioned at the bottoms of the modules, while line 28 would carry feed water leaving the top of module 24 to the inlet at the bottom of module 26. Also, if desired, modules 24 and 26 may be connected in parallel with fresh feed liquid entering both modules and spent feed liquid leaving both modules.

After leaving module 26, the spent feed water is discharged through a strainer 20 and a relief valve 22. Valve 22 is a pressure-regulating valve which permits flow of spent liquid through the outlet line 7 when the pressure of the spent liquid is at a predetermined pressure in excess of the osmotic pressure across the membrane of the desalination unit between the feed liquid and the product liquid. When the desalination unit is not operating and the flow of feed liquid through inlet line 6 is stopped, valve 22 prevents the flow of spent liquid through outlet line 7 at a pressure which is equal to or less than the osmotic pressure across the membrane. The combination of valving provided by valves 18 and 22 to prevent reverse flow of liquid through the desalination unit which could damage the membrane will be described in more detail later.

The flow of spent feed liquid to waste is controlled by an outlet restrictor 8. As illustrated in FIG. 1, a convenient flow restrictor is a stainless steel hypodermic needle tube having a length of about one foot and having an internal diameter of about 0.013 inches. When used in conjunction with a home desalination unit which operates from tap-water pressure, this type of restrictor maintains the flow of spent feed liquid relatively constant at a desired rate. Within the flow rate as controlled by the outlet restrictor, which is quite low, the ratio of the product water that is recovered from the unit to the inlet feed water is about 1 to 3.

A vent 27 communicates with the desalination unit 10 to maintain atmospheric pressure within the unit in contact with the product water. Also, vent 27 serves as a product water overflow line through which product water drains when the unit is full.

Turning to FIG. 3, desalination module 24 is shown as composed of an outer cylinder 44 and an inner cylinder 46 which are held in concentrically aligned relation by an inlet end cap 38 and an outlet end cap 58. An inlet fitting 36 directs feed water to a manifold chamber 40 within end cap 38. From the manifold chamber, the feed liquid is fed through a distribution ring 42 to an annular feed chamber 48. Cylinders 44 and 46 may be formed of any suitable inert material such as polyvinyl chloride. The cylinders 44 and 46 are permanently bonded to inlet end cap 38 and to an outlet end cap 58 by any suitable means such as the use of solid cement or thermal welding. End caps 38 and 58 are also formed of an inert material such as polyvinyl chloride. If desired, the end caps 38 and 58 may be removably mounted on cylinders 44 and 46 by any suitable means (not shown), and may include sealing means, such as O-rings, to prevent leakage between the cylinders 44 and 46 and the end caps 38 and 58.

After passing through annular feed chamber 48, the feed water flows through a distribution ring 64 to a manifold chamber 62 in outlet end cap 58. The feed water is then discharged through an outlet fitting 60 to line 28, which is connected to desalination module 26, as illustrated in FIG. 2. The distribution ring 64 is identical in its configuration to distribution ring 42 which will be described in detail later. Within the range of pressures, flow rates and compositions encountered in the feed water for a home desalination unit, we preferably maintain the distance across the annular feed chamber, i.e., the gap between cylinders 44 and 46, within about 0.020 inches to about 0.10 inches. This distance is measured from membrane surface to membrane surface and does not include the thickness of the membranes and backing material for the membranes.

The desalination modules 24 and 26 are held within the container 30 which has a body portion 32 and a cover 34. As illustrated in FIG. 3, the container includes inwardly directed protuberances 35 which hold the modules 24 and 26 within container 30.

Turning to FIG. 5, the annular feed chamber 48 is defined by the inner surface of the larger diameter cylinder 44 and the outer surface of the smaller diameter cylinder 46. Desalination membranes 50 are positioned about the inner and outer surfaces of the annular space 48 in supporting contact with the cylinders 44 and 46. Positioned between the membrane 50 and its supporting cylinder, 44 or 46, is a porous backing material 52. A suitable backing material is a non-woven fabric of cellulose, rayon or polyester having a thickness of about 0.01 to about 0.025 inches, which materials are available commercially. The porous backing material should be tasteless, odorless and non-toxic and it has been found that the non-woven materials appear to provide a better transverse flow, i.e., parallel to the membrane surface, than do woven fabrics. As described previously, in a preferred embodiment of our invention, the porous backing material is a fabric which is impregnated with activated charcoal. Such a material is currently available from the C. H. Dexter & Sons Company, One Elm Street, Windsor Locks, Conn. 06096, as Dexsan Activated Carbon Web.

After passage of liquid from the annular space 48 through the membranes 50, the product liquid moves transversely of the membranes through the porous backing material 52. In the case where the porous backing material 52 is impregnated with activated charcoal, this movement provides very intimate contact between the product liquid and the activated charcoal without channeling or an excessive pressure drop. The product water is then discharged through holes 68 and 66.

The product water is maintained within the container 30, which serves also as a reservoir for the product water. With the relatively low flow rates used in our desalination unit, we have found that the use of merely one hole in each of the inner and outer cylinders providing the annular feed liquid chamber 48 is sufficient to accommodate the flow of the product water. If desired, of course, a number of holes could be provided in the inner and outer cylinders 46 and 44, or the cylinders 46 and 44 could be made of a porous material. Also, if desired, the membrane 50 may have several layers of porous backing material positioned between the membrane and the adjacent cylinder. One or more of the layers may contain activated charcoal, as described.

Turning to FIG. 4, the outer cylinder 44 and inner cylinder 46 are joined to end cap 38 in a fluid tight relationship. End cap 38 defines a manifold chamber 40 which communicates with annular feed chamber 48 by means of a distribution ring 42. The distribution ring 42 contains a plurality of uniformly distributed holes 43 such that feed water entering the annular chamber 48 is distributed uniformly across the cross-section of the feed chamber. Inasmuch as the module 26 is inverted with respect to module 24, as shown in FIG. 2, the inlet end cap 38 is shown at the top of module 24 and at the bottom of module 26 while the outlet end cap 58 is shown at the bottom of module 24 and the top of module 26.

The membrane 50 which is used in our apparatus is sealed to cylinders 44 and 46 in the manner illustrated in FIG. 4. This is accomplished by simply taping the membrane 50 to the surface of cylinder 44 and 46 by tape 54. This is only one means of fixing the membrane with respect to the cylinder and it should be understood that any suitable means may be used for holding the membrane in position in accord with our invention. A suitable tape 54 is a polyimide tape having a silicone adhesive.

As described, our invention provides a reverse osmosis unit that is admirably suited for intermittent operation in purifying water for home use. The valves 18 and 20 may, if desired, be manually operated since the type of valving employed in not critical so long as it provides a means to maintain the pressure of the feed liquid within the unit at a level which prevents osmotic flow from the supported to the unsupported side of the membrane 50 when the unit is not in operation. If desired, the product water overflow line could be connected to the outlet line 7 downstream from the valve 22.

Also, a suitable liquid level indicator (not shown) could be connected to the exterior of container 30 and would indicate the height of product liquid therein by the level of liquid in the sight glass of the indicator. An automatic shutoff valve (not shown) could also, for example, be operated by a float within container 30 which would actuate a valve to shut off flow through line 6 when the level of product water reached a predetermined height.

Another variation within the scope of our invention is to use a valve that performs both the function of relief valve 22 and the function of flow restrictor 8. Such a valve prevents flow of spent feed water through line 7 at a pressure equal to or less than the osmotic pressure across the membrane and also maintains the flow rate at a predetermined low level when the pressure of the spent feed liquid is at a predetermined level in excess of the osmotic pressure across the membrane. Since the osmotic pressure across the membrane will vary with the nature of the feed liquid, e.g., its degree of salinity, valves 18 and 22 may be adjustable to maintain whatever pressure is necessary on the feed liquid within the unit to prevent osmotic flow from the supported to the unsupported side of the membrane when the unit is not in use.

When the desalination modules 24 and 26 are connected in series, the osmotic pressure across the membrane in the downstream module 26 will be somewhat higher than the osmotic pressure across the membrane in the upstream module due to the increased salinity of the feed water in the downstream module. Thus, the pressure of the feed liquid within the feed liquid chamber is maintained sufficiently high to prevent osmotic flow across the membrane in the downstream module when flow of feed liquid to the unit is stopped. This amount of pressure will also, of course, prevent osmotic flow across the membrane in the upstream module.

As described, our invention includes the use of more than two cylinders which are concentrically aligned with each adjacent pair of cylinders defining a feed liquid chamber having a reverse osmosis membrane positioned on both the inner and outer surfaces of the feed chamber. When, for example, three cylinders are concentrically aligned in this manner, the middle cylinder has a reverse osmosis membrane mounted on both its outer and inner surfaces. The outer surface of the middle cylinder defines the inner surface of the feed liquid chamber between the outer and middle cylinder while the inner surface of the middle cylinder defines the outer surface of the feed liquid chamber between the middle cylinder and the inner cylinder. When three or more cylinders are employed, the intermediately positioned cylinders have a reverse osmosis membrane positioned on both their inner and outer surfaces. To remove product water from the intermediate cylinders the end caps may be modified so that product water is removed from the end or ends of the intermediate cylinders. This can be conveniently accomplished when using three concentric cylinders by providing a product water passage (not shown) through end cap 58 which leads from the end of the intermediate cylinder and transports product water to the interior of container 30. Also, end cap 58, if used for three concentric cylinders, may be modified to provide a manifold passage or passages opening into both the feed chamber between the outer and middle cylinders and the feed chamber between the middle and inner cylinders. If more than three concentrically aligned cylinders are used, the end caps may be further modified in the above described manner to provide flow passages for product water from the end or ends of the intermediate cylinders and to provide flow passages for feed water to each of the several feed liquid chambers defined by the concentrically aligned cylinders.

Although our invention is illustrated as a reverse osmosis unit which may be used on an intermittent basis by connecting it to a water source, such as a kitchen faucet, it should be understood that our device may also be installed as a permanent unit. In permanently installing our device, the configuration shown in FIG. 2 would be slightly modified by placing an air gap in line 7 (not shown) of a type similar to that used in the drain lines of permanently installed automatic dishwashers. As an example of an air gap, a tee could be placed in outlet line 7 with the side outlet from the tee leading to a region of atmospheric pressure.

We claim:

1. In a reverse osmosis unit, the combination comprising:
    a plastic membrane capable of removing impurities from a feed liquid through reverse osmosis to obtain a liquid product, said membrane having a supported side and an unsupported side;
    a feed liquid chamber in contact with said unsupported side;
    a product liquid reservoir in contact with said supported side;
    a feed liquid inlet to said feed liquid chamber;
    a spent feed liquid outlet from said feed liquid chamber, and means to maintain the pressure of feed liquid within said feed liquid chamber at a level sufficient to prevent the osmotic flow of liquid across said membrane from said supported side to said unsupported side when said inlet is closed.

2. The reverse osmosis unit of claim 1, wherein said means to maintain the pressure of said feed liquid within said feed liquid chamber includes an inlet check valve positioned in communication with said inlet and an outlet relief valve positioned in communication with said outlet, said inlet check valve preventing back flow of feed liquid through said inlet, and said outlet relief valve preventing flow of spent feed liquid through said outlet at a pressure equal to or less than the osmotic pressure across said membrane.

3. The reverse osmosis unit of claim 2, including means to remove particles from the feed liquid which could be injurious to said membrane prior to introduction of the feed liquid to said feed liquid chamber.

4. The reverse osmosis unit of claim 1 including means to maintain the flow of spent feed liquid through said outlet relatively constant at a predetermined flow rate when said unit is in operation.

5. The reverse osmosis unit of claim 1 including a plurality of concentrically aligned cylinders, each adjacent pair of said cylinders defining an annular feed liquid chamber having as an outer surface the inner surface of the cylinder or larger diameter and as an inner surface the outer surface of the cylinder of smaller diameter, and a reverse osmosis membrane mounted on the inner and outer surfaces of said annular feed liquid chamber.

6. The reverse osmosis unit of claim 5 wherein the distance across said annular feed liquid chamber is in the order of about 0.020 to about 0.10 inches from the membrane on the inner surface of said chamber to the membrane on the outer surface of said chamber.

7. The reverse osmosis unit of claim 5 including means to provide uniform flow of a feed liquid through said annular feed liquid chamber.

8. The reverse osmosis unit of claim 1, wherein said membrane is a cellulose acetate film.

9. The reverse osmosis unit of claim 1, wherein a porous layer material containing activated charcoal is positioned in contact with the supported side of said membrane.

10. The reverse osmosis unit of claim 1, including vent means in communication with said product reservoir.

11. In a reverse osmosis unit having a cast plastic membrane capable of removing impurities from a feed liquid through uniform flow of liquid through said membrane by reverse osmosis, means to supply a feed liquid to the feed side of said membrane, and means to remove a liquid product from the product side of said membrane, the improvement comprising: a layer of porous material containing activated charcoal positioned on the product side of said membrane such that liquid flowing uniformly through said membrane comes into uniform contact with the activated charcoal in said porous material.

12. The reverse osmosis unit of claim 11 wherein said layer of porous material containing activated charcoal is in contact with said membrane.

13. The reverse osmosis unit of claim 11 wherein said membrane is a cellulose acetate film.

* * * * *